(12) United States Patent
Aydemir et al.

(10) Patent No.: US 6,678,782 B1
(45) Date of Patent: Jan. 13, 2004

(54) FLOW ARCHITECTURE FOR REMOTE HIGH-SPEED INTERFACE APPLICATION

(75) Inventors: Metin Aydemir, Durham, NC (US); Andrew John Rindos, III, Chapel Hill, NC (US); Jorge Rolando Rodriguez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 09/604,446

(22) Filed: Jun. 27, 2000

(51) Int. Cl.[7] .................. G06F 13/00; G06F 3/00; H04L 12/50
(52) U.S. Cl. .................. 710/316; 710/29; 370/360
(58) Field of Search .................. 710/316, 317, 710/29, 52–56; 370/357, 360, 362

(56) References Cited

U.S. PATENT DOCUMENTS

| | | | |
|---|---|---|---|
| 5,315,708 A | * 5/1994 | Eidler et al. ............. 711/119 |
| 5,764,924 A | 6/1998 | Hong | |
| 5,764,961 A | 6/1998 | Bhat | |
| 5,790,816 A | 8/1998 | Fok et al. | |
| 5,802,333 A | 9/1998 | Melvin | |
| 5,887,144 A | 3/1999 | Guthrie et al. | |
| 5,909,564 A | 6/1999 | Alexander et al. | |
| 5,923,660 A | 7/1999 | Shemla et al. | |
| 5,930,261 A | 7/1999 | Shemla et al. | |
| 5,983,308 A | 11/1999 | Kerstein | |
| 6,003,105 A | 12/1999 | Vicard et al. | |
| 6,067,301 A | * 5/2000 | Aatresh ............. 370/418 |
| 6,263,374 B1 | * 7/2001 | Olnowich et al. ........ 709/253 |
| 6,275,491 B1 | * 8/2001 | Prasad et al. ............ 370/389 |
| 6,442,172 B1 | * 8/2002 | Wallner et al. .......... 370/416 |

FOREIGN PATENT DOCUMENTS

DE     19980924 U     9/1998

OTHER PUBLICATIONS

1000/Research Disclosure Jul. 1999, 42399 "Creating Configurable Network Interface", Disclosed by International Business Machines Corporation.

* cited by examiner

*Primary Examiner*—Glenn A. Auve
*Assistant Examiner*—Trisha Vu
(74) *Attorney, Agent, or Firm*—Scott W. Reid

(57) ABSTRACT

A system having a high speed switching interface between remote buses is disclosed herein. The system includes a switch fabric to which multiple remote bus interfaces are connected. A programmable flow queue that includes multiple parallel logic flow queues is utilized for scheduling packets in accordance with protocol requirements of the remote bus interface.

9 Claims, 6 Drawing Sheets

| Row    col. ? | PMW | DRR | DWR | DRC | DWC |
|---|---|---|---|---|---|
| 1. PMW | no | yes | yes | yes | yes |
| 2. DRR | no | yes | yes | yes | yes |
| 3. DRW | no | yes | yes | yes | yes |
| 4. DRC | no | yes | yes | yes | yes |
| 5. DWC | yes | yes | yes | yes | yes |

FLOW ARCHITECTURE FOR REMOTE HIGH-SPEED INTERFACE APPLICATION

BACKGROUND OF THE INVENTION

1. Technical Field

The present invention relates in general to an improved method and system for managing communications networks. In particular, the present invention relates to a switching flow control mechanism within a telecommunications network. More particularly, the present invention relates to a method and system for replacing conventional prioritized output queuing with a logical flow control mechanism implemented within a switch fabric that can be utilized as a remote bus interconnect, such that data ordering as well as flow control concerns can be simultaneously addressed.

2. Description of the Related Art

Previously, slow network speeds and flow control provided by higher layer protocols such as Transmission Control Protocol/Internet Protocol (TCP/IP) have prevented flow control at switches from being a problem. With the recent improvement in node-to-node flow control and data transmission media within telecommunications networks, congestion at bridges or switches has become more problematic. The recent increase in network speeds up to gigabits per second, coupled with full-duplex transmission capabilities, has mandated the need for a flow control mechanism. The goals of such flow control include efficiency and fairness.

Server input/output (I/O) is evolving in directions defined by new initiatives such as Next Generation I/O (NGIO), Future I/O (FIO), and System I/O (SIO). NGIO, FIO, and SIO have been combined into the InfiniBand architecture by the InfiniBand consortium. These I/O adapters require a switch fabric to interconnect host channel adapters (HCAs) to target channel adapters (TCAs).

Many conventional switching fabrics, such as PRIZMA switching fabric produced by International Business Machines (IBM), utilizes a programmable packet flow priority scheme. At initialization, the number of priorities available can be set to a value between one and n. Hence, such a switch can support up to n priority levels implemented by an n-queues prioritization scheme. Flow control mechanisms are available to control the flow of packets having differing priorities at the input and output of the switching fabric. Input flow control in such a switching fabric may be achieved utilizing on-chip pins or by receive-grant information in the header of each packet. Flow control at the output of the switching fabric may be provided by send-grant pins.

In such a priority flow control scheme, the disablement of a priority will lead to all lower priority flows also being disabled. The n queues corresponding to the n priority levels are thus serviced with a priority rule whereby a packet waiting in a high priority queue is transmitted before any lower priority queues are serviced.

Flow control thresholds and backpressure triggers within conventional switching fabrics are based on priority based queuing that utilized cumulative output queue size for different queue sizes. Therefore, whenever a high priority is disabled, all lower priority traffic is guaranteed to be disabled. Serial queues, such as peripheral component interconnect (PCI) bus interfaces, may become bottlenecks that may potentially reduce the performance advantage of utilizing a high-speed network switching interface. PCI is a well-known standard for 32/64-bit local buses designed for fast access to peripheral devices such as user displays, disk drives, modems, etc., within personal computers.

Due to the physical interruption of the bus interfaces at switch I/O's, adequate buffer management must be provided to prevent intra-switch buffer overflow or underflow. Serial queues, such as remote PCI bus interfaces, become potential bottlenecks of flow control is maintained serially within the switching fabric.

It can therefore be appreciated that a need exists for an improved system and method to utilize queuing capabilities of a switch to maintain a parallel flow control and data ordering mechanism by which remote bus interfaces can be remotely switched.

SUMMARY OF THE INVENTION

A system having a high speed switching interface between remote buses is disclosed herein. The system includes a switch fabric to which multiple remote bus interfaces are connected. A programmable flow queue that includes multiple parallel logic flow queues is utilized for scheduling packets in accordance with protocol requirements of the remote bus interface.

All objects, features, and advantages of the present invention will become apparent in the following detailed written description.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein

FIG. 3b is a diagrammatic illustration of bus architecture specification rules that may be implemented within the logic port adapter in FIG. 3a;

DETAILED DESCRIPTION OF THE PREFERRED EMBODIMENT

The present invention replaces the priority scheme of conventional intra-switch flows with a logical flow control architecture in which the previous n priority queues are replaced by n logic flow queues. A switching fabric organization having multiple flows per port is thus disclosed to support implementations such as PCI-to-PCI switching. The present invention modifies conventional switch fabric such as that found within the newly developed PRIZMA switch (product of IBM) to efficiently support multiple diverse traffic flows.

This new output queue architecture allows for independent servicing and flow control of multiple logical flows. Such flexible queuing architecture is required, for example, in implementations in which PCI bus ordering commands must be observed. Each logical flow has a queue (i.e., a logical port) at the physical output port similar to conventional priority queues. The logical flow queues can be enabled and disabled for transmission individually and independently. Unlike conventional priority queues, these logical flow queues are not preprogrammed with an intrinsic interdependent ordering scheme. The physical output port services the logic flow queues in an order that is programmably determined in accordance with a desired implementation. For example, an output flow from the aggregate logical flow queues to the physical output port may be performed in "round-robin" fashion or, in PCI bus applications, the flow scheduling will be programmed to enforce the requirements established by the PCI bus command ordering rules.

Figure 1:
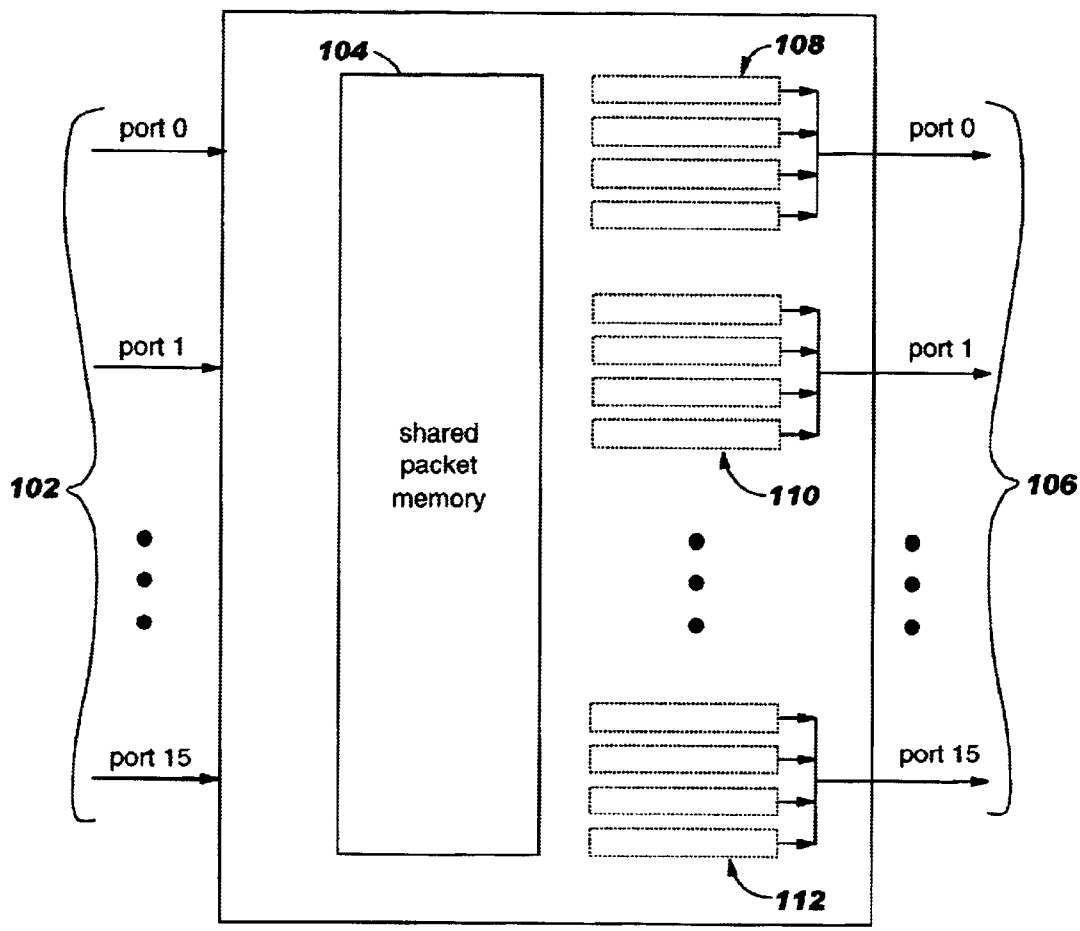
FIG. 1 depicts a telecommunications switch in which the flow architecture of the present invention is implemented.

With reference now to the figures, wherein like reference numerals refer to like and corresponding parts throughout, and in particular with reference to FIG. 1, there is depicted a telecommunications switch 100 (sometimes referred to as a "switch fabrics") in which the flow architecture of the present invention is implemented. In the depicted embodiment, switch 100 is a packet-based 16×16 switching unit having 16 bi-directional ports. For ease of illustrating the bi-directional nature of the ports, 16 input ports 102 are shown which correspond to 16 output ports 106. Switch 100 may be a PRIZMA switch in which each port can provide a bandwidth of 2 Gbps in each direction or more. This port speed makes switch 100 particularly suitable for is providing the bandwidth required by today's high speed networking I/O's.

As further depicted in FIG. 1, switch 100 includes a shared packet memory module 104 that may include any of a variety of possible computer memory devices. As explained in further detail with reference to FIGS. 2 and 3, an incoming packet from one of input ports 102 is programmable at initialization. In this regard, the depicted embodiment assumes a packet size of 32 bytes containing a 3-byte header and data fields. The destination port (one of output ports 106) is specified in the packet header. Multicasting from any of output ports 106 by providing the destination port address in a bitmap format.

Switch 100 has a programmable packet delivery (queuing) implemented within a set of logical flow queues including logic flow queues 108 associated with output port 0, logical flow queues 110 associated with output port 1, and logical flow queues 112 associated with output port 15.

Message Structure

Figure 2:
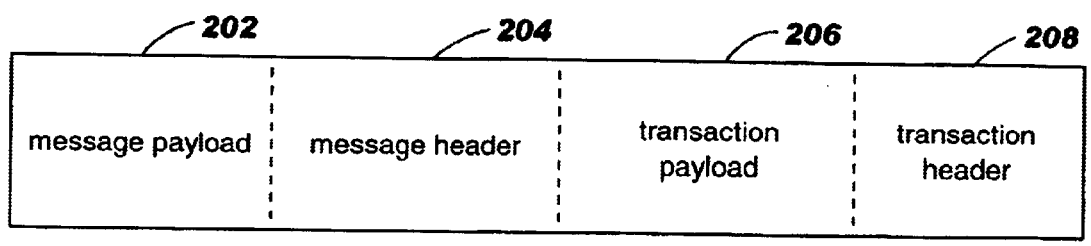
FIG. 2 illustrates an intra-switch packet structure in accordance with a preferred embodiment of the present invention.

Referring now to FIG. 2 there is illustrated an intra-switch packet structure in accordance with a preferred embodiment of the present invention. As will be explained in further detail hereinbelow, switch 100 constructs a transaction packet 200 in response to a service or access request from a remote bus. As shown in FIG. 2, transaction packet 200 includes of a transaction header 208 that contains routing information relevant to the intra-switch routing of transaction packet through switch 100 to the correct output (target) port. Transaction packet 200 further includes a transaction payload 206 that contains a message to be interpreted and executed by target bus interface logic (not depicted). In the context of PCI-to-PCI switching, such bus interface logic would be target bus PCI sequencers.

The original message within transaction packet 200 includes of a message header 204 and a message payload 202. Message header 204 contains transaction-specific information (command, address, byte enables, for example) and message payload 202 contains up to 32 bytes of data. Messages with less than 32 bytes of payload data may be tagged as such within transaction header 208. This tag is utilized by the aforementioned target bus interface logic (sequencer) to generate a sequence of Memory Write commands to transfer one or more words of data.

Queue Structure

Figure 3A:
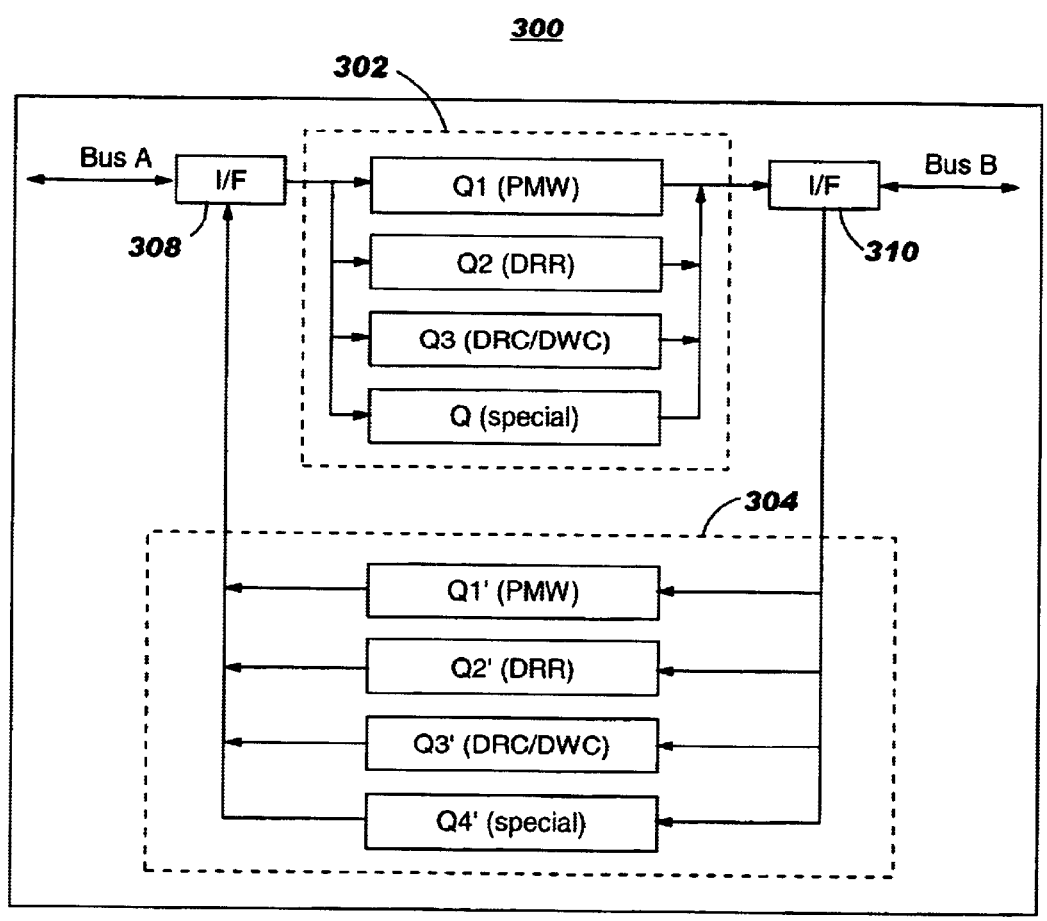
FIG. 3a depicts a logic port adapter for queuing packets to physical ports in accordance with a preferred embodiment of the present invention.

With reference now to FIG. 3a, there is depicted a logic port adapter 300 for queuing packets from input ports to physical output ports in accordance with a preferred embodiment of the present invention. One of the key features of the queuing system and method of the present invention is that it provides for flexible routing and output queuing that is adaptable to any specified remote bus architecture. For purposes of illustration and explanation, the remaining figures will be described in the context of a PCI-to-PCI switching configuration.

Logic port adapter 300 is implemented in the switching fabric (sometimes referred to as the "switching is core") of switch 100 which employs output port queuing. Therefore, all of logical flow queues 108 through 112 have outputs directed to the output, or "downsides" of switch 100. FIG. 3a illustrates the organization of the logical flow queues as implemented with the switch core. Specifically, logical flow queues Q1, Q2, Q3, and Q4 comprise a programmable flow queue block 302. It should be noted that programmable flow queue block 302 is associated with the output port 310 associated with remote bus B. Similarly, logical flow queues Q1', Q2', Q3', and Q4' comprises a programmable flow queue block 304 that is associated with the input port 308 of remote bus A. In the depicted example, Bus A and Bus B are bi-directional and may therefore act as a source and a destination simultaneously. Although only two such buses are depicted; in FIG. 3a, it should be noted that logic port adapter 300 can support configurations having one or more source buses and one or more destination buses.

Transaction packets, such as transaction packet 200, that are to be delivered to bus B, are sent to output port 310 via programmable logic flow queue 302. The queue assigned for each type of transaction is determined in accordance with the following criteria. First, transactions flowing through the system must satisfy the data ordering rules utilized by Bus A and/or Bus B. Second, multiple transactions moving in independent parallel paths will provide superior flow and buffering performance.

Referring now to FIG. 3b, a diagrammatic illustration of bus architecture specification rules that may be implemented within the logic port adapter in FIG. 3a in regard to the aforementioned first criterion for queue assignment. In accordance with the depicted example, packet data passing through logic port adapter 300 must satisfy the data ordering rules in FIG. 3b. The row→ column designation within FIG. 3b indicates a permissible transfer. The specification rules shown in FIG. 3b will be utilized to provide an explanatory context in which the queuing scheme and command handling are performed with respect to the embodiments depicted in FIGS. 4 and 5 below.

Command Handling

Figure 4:
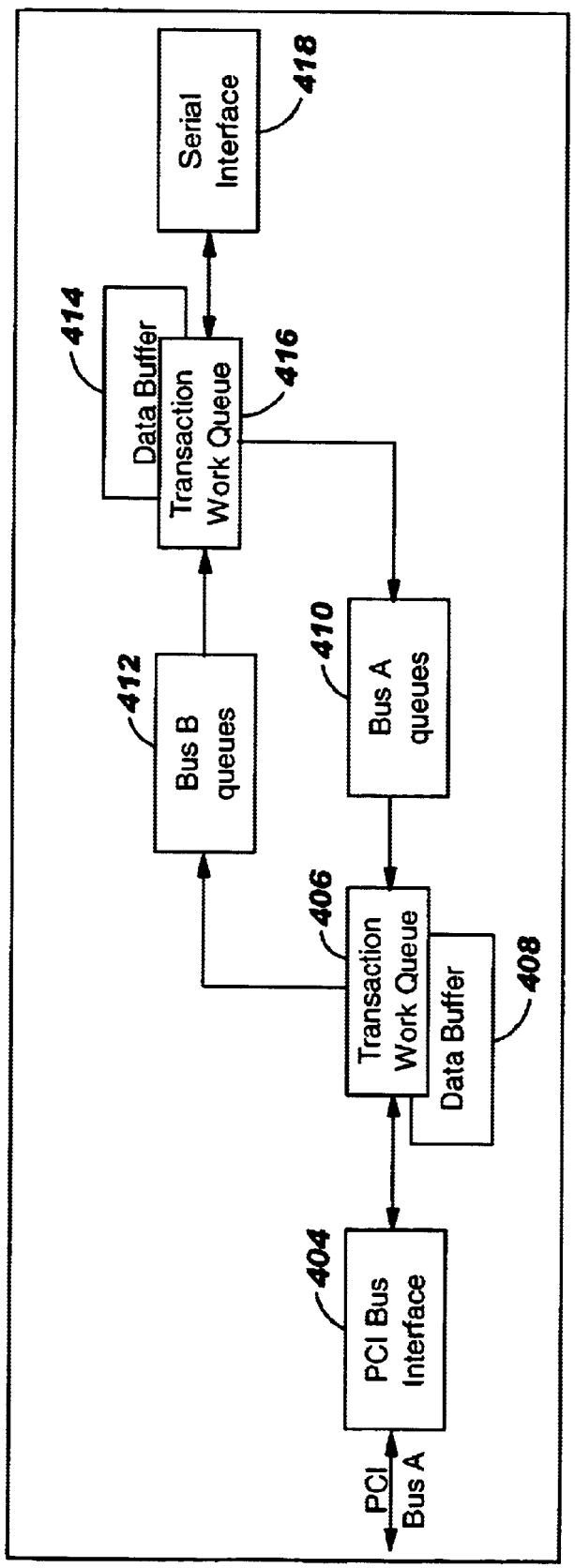
FIG. 4 is a block diagram representation of a switch architecture in accordance with a preferred embodiment of the present invention.

With reference now to FIG. 4, there is depicted a block diagram representation of a switch architecture 400 in accordance with a preferred embodiment of the present invention. Switch architecture 400 includes bi-directional PCI buses A and B and corresponding PCI interfaces 404 and 418. Switch architecture 400 further includes a programmable flow queue 412 associated with the output port of bus B, and a programmable flow queue 410 associated with the output of bus A. Programmable flow queues 412 and 410 contain multiple logical port queues and are thus analogous to programmable flow queues 302 and 304.

As further depicted in FIG. 4, switch architecture 400 further comprises a transaction work queue (TWQ) 406 and a TWQ 416, which process incoming and outgoing packets that are to be delivered between PCI interfaces 418 and 404 via programmable flow queues 410 and 412. The high level organization of switch architecture 400 that is utilized for bi-directional command flow and data is described hereinbelow.

a. Posted Memory Write

In response to receipt of a PCI Memory Write (MW) access request to prefetchable address space within PCI interface 404, the PCI transaction information is loaded into TWQ 406 if space is available in TWQ 406. If there is no space in TWQ 406, the transaction is retried until it is successfully allocated within TWQ 406. Subsequently, logic within TWQ 406 constructs a transaction packet and sends this packet to the designated transaction queue, Q1, which, as shown in FIG. 3a, has been designated as a posted memory write (PMW) queue of target bus B This packet will be accordingly routed to target bus B as indicated in the transaction header of the transaction packet.

Each incoming packet entering PCI interfaces 404 or 418 carries within its message header a sequence number relating a PCI write transaction to the PMW packets that is produces. A second sequence number is maintained for each source bus. This additional sequence number is incremented each time a write transaction is executed at the source PCI bus interface. The last PMW in the sequence associated with a single PCI write operation at the source bus will also carry a last PMW sequence indicator set equal to one.

Read transactions of a source bus traveling in the same direction as the PMW transactions on the same bus will pick up this sequence number in its message header within TWQ 406. Upon arrival at target bus B, the read transaction will wait for all PMW transactions with a is sequence number that is less than or equal to its own sequence number, before it is allowed to proceed. In this manner the data ordering for PCI interface are maintained in a non-serial transmission context.

When the transfer is completed on the source bus A, and all data in the data buffer associated with this transaction (buffer 408) has been packetized and forwarded to the switch fabric, the transaction information is erased from TWQ 406.

b. Delayed Read Request and Delayed Read Completion

Switch architecture 400 responds to a PCI I/O Read Request, Configuration Read, Memory Read (MR), MRL, or MRM. Transaction information encoded with an incoming packet for a read request is compared with transaction information of the transactions currently being processed within TWQ 406. A match indicates that there is an active delayed read request (DRR) for the transaction associated with the incoming packet within switch architecture 400.

In the case of an active DRR (match found), a data available flag is checked to determine whether data for the transaction is currently within data buffer 408. If such transaction data is in data buffer 408, that data is then transferred to the requesting master. If there is no such transaction data in data buffer 408, then the transaction is retried.

In the case that the transaction data encoded within the incoming packet (requesting transaction) does not match the transaction data for any of the transactions currently being processed within TWQ 406, the response of switch architecture 400 depends on the current availability of a queue within TWQ 406. If a work queue is not available and there is no available buffer space within data buffer 408 (switch busy condition), the incoming transaction request (read request) is retried later. If a work queue is currently available within TWQ 406 or buffer space is available within data buffer 408, the PCI transaction request is retried while the transaction related control information (command, address, byte enables) is stored in TWQ 406.

When the transaction control information is added to TWQ 406, switch architecture 400 constructs a transaction packet and transmits this packet into the delayed transaction queue (delayed read request Q2) of destination bus B. A sequence number from the PMW sequence is assigned to this queued transaction packet. The transaction packet is then routed by logic within programmable flow queue 302 to target bus B as indicated in the transaction packet header. The message payload is empty for a DRR.

A copy of the message header is maintained in TWO 406 and memory space is allocated in data buffer 408, an both of these resources are utilized when the associated DRC is received from target bus B. Additional PCI Read commands can be serviced until one of the following enumerated conditions is detected. (1) All of the space in TWO 406 and/or data buffer 408 has been allocated. (2) The Q2 (DRR) queue for target bus B is full (as signaled by receive grant of the switch core).

When the DRR arrives at the input of Q2, sequencer logic within programmable flow queue 302 compares the sequence number for the DRR with the sequence number and the "Last PMW in Sequence" flag carried by the PMWs that have already arrived at the target. When all PMWs have exited as required, and all the write data has been sent to the target, the sequencer logic initiates a request at target bus B to read one cache line from memory. When that data is received from the target (from memory in this case), a DRC packet is constructed and transmitted to Q3 (DRC/DWC queue) associated with source bus A. If the PCI command was an MRM, the sequencer logic within the programmable flow queue will prefetch data on behalf of the PCI master by initiating requests on the bus to read additional cache lines from memory. The target bus sequencer will continue prefetching data as long as the master keeps the PCI transfer active.

When the DRC packet is received at the initiating bus in Q3, the packet is removed when it reaches the head of the queue. The information in the message header is matched to the assigned TWQ 406 and the data in the message payload is moved into data buffer 408 that has been allocated.

The logic associated with target bus B interface 418 cannot send data to source bus A unless the data buffer in source bus A has adequate space. Prefetch logic within target bus B interface 418 negotiates with source bus A logic 404 for a time at which it can send additional data to a buffer in source bus A interface 404. A priority queue Q4 is utilized as the high-reliability medium across which such negotiation messages are delivered.

Figure 5:
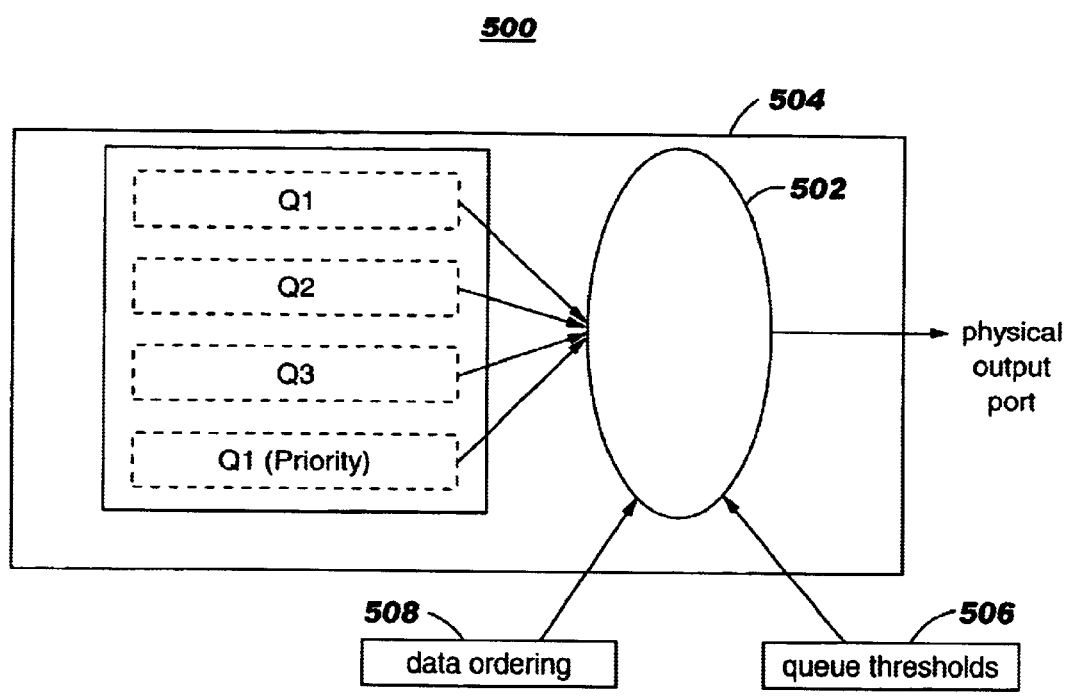
FIG. 5 is block diagram illustration of a programmable packet output queuing in accordance with a preferred embodiment of the present invention.

With reference now to FIG. 5 is block diagram illustration of a programmable packet output queuing in accordance with a preferred embodiment of the present invention. As shown in FIG. 5, a switching interface 500 includes a programmable flow queue 504 in communicative contact with a scheduler 502. Programmable flow queue includes multiple parallel logical flow queues that may be designated as shown in FIGS. 3a and 3b.

As further depicted in FIG. 5, a queue threshold input 506 and a data ordering input 508 are applied to scheduler 502.

Programmable logic within scheduler translates input from a queue threshold input 506 and a data ordering input 508 into scheduling commands to programmable flow queue 504 such that outgoing packets from switching interface 500 may be transmitted in accordance with protocol requirements and real-time queue status.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer program product in another computer memory, for example, in a disk drive (which may include a removable memory such as an optical disk or floppy disk for eventual utilization in disk drive).

While the invention has been particularly shown and described with reference to a preferred embodiment, it will be understood by those skilled in the art that various changes in form and detail may be made therein without departing from the spirit and scope of the invention.

What is claimed is:

1. An apparatus for providing a high-speed switching interface between remote buses where each said bus has a specific bus architecture for determining data ordering over said bus, said apparatus comprising:

a switch fabric;

at least two remote buses interfaced with said switch fabric; and a programmable flow queue for scheduling packets in accordance with protocol requirements of said remote bus interfaces, said programmable flow queue comprising data ordering logic for scheduling packets in accordance with said bus architectures.

2. The apparatus of claim 1, wherein said programmable flow queue includes a plurality of parallel logical flow queues and said data ordering logic characterizes said plurality of parallel logic flow queues in accordance with said bus architectures.

3. The apparatus of claim 2, wherein said programmable flow queue further includes logic for programmably adjusting queue threshold requirements on each logic flow queue of said plurality of parallel logic flow queues independently from one another.

4. The apparatus of claim 3, wherein said data ordering logic further comprises order integrity logic for ensuring that packets routed over different parallel logical flow queues are nevertheless processed in the proper order according to the order in which said packets entered said remote bus interface.

5. The apparatus of claim 1, wherein said switch fabric includes a source port for receiving incoming packets from said remote buses, and wherein said apparatus further comprises a transaction work queue that holds bus architecture instructions for routing said incoming packets to said programmable flow queue in accordance with said bus architectures.

6. A method providing a high-speed switching interface between remote buses across a switch fabric where each said bus has a specific bus architecture for determining data ordering over said bus, said method comprising the steps of:

interfacing at least two remote buses with said switch fabric; and scheduling packets in accordance with protocol requirements of said remote bus interfaces and in accordance with said bus architectures by a programmable flow queue.

7. The method of claim 6, wherein said programmable flow queue includes a plurality of parallel logical flow queues, said method further comprising the step of adjusting queue threshold requirements on each logic flow queue of said plurality of parallel logic flow queues independently from one another.

8. The method of claim 7, further comprising the step of ensuring that packets routed over different parallel logical flow queues are nevertheless processed in the proper order according to the order in which said packets entered said remote bus interface.

9. The method of claim 6, wherein said switch fabric includes a source port for receiving incoming packets from said remote buses, and wherein said method further comprises routing said incoming packets to said programmable flow queue in accordance with said bus architectures.

* * * * *